United States Patent
Gutierrez et al.

(10) Patent No.: US 9,591,493 B2
(45) Date of Patent: Mar. 7, 2017

(54) WIRELESS COMMUNICATION FINE TIMING MEASUREMENT PHY PARAMETER CONTROL AND NEGOTIATION

(71) Applicant: BROADCOM CORPORATION, Irvine, CA (US)

(72) Inventors: Luis Javier Gutierrez, San Francisco, CA (US); Qi Wang, San Francisco, CA (US); Vinko Erceg, Cardiff by the Sea, CA (US); Hariramanathan Ramakrishnan, Fremont, CA (US)

(73) Assignee: BROADCOM CORPORATION, Irvine, CA (US)

( * ) Notice: Subject to any disclaimer, the term of this patent is extended or adjusted under 35 U.S.C. 154(b) by 102 days.

(21) Appl. No.: 14/462,659

(22) Filed: Aug. 19, 2014

(65) Prior Publication Data

US 2015/0049716 A1 Feb. 19, 2015

Related U.S. Application Data

(60) Provisional application No. 61/867,545, filed on Aug. 19, 2013.

(51) Int. Cl.
*H04W 24/02* (2009.01)
*H04W 56/00* (2009.01)
(Continued)

(52) U.S. Cl.
CPC .......... *H04W 24/02* (2013.01); *H04B 7/0413* (2013.01); *H04B 7/0617* (2013.01);
(Continued)

(58) Field of Classification Search
CPC ... H04W 84/12; H04W 56/001; H04W 24/02; H04B 7/0413; H04B 7/0689; H04B 7/0617

See application file for complete search history.

(56) References Cited

U.S. PATENT DOCUMENTS

| | | | |
|---|---|---|---|
| 2011/0110349 A1* | 5/2011 | Grandhi | H04W 28/18 370/338 |
| 2012/0021692 A1* | 1/2012 | Lee | H04B 7/0617 455/67.11 |

(Continued)

*Primary Examiner* — Kwang B Yao
*Assistant Examiner* — Moo Ryong Jeong
(74) *Attorney, Agent, or Firm* — Garlick & Markison; Shayne X. Short

(57) ABSTRACT

A wireless communication device (e.g., operative within a wireless local area network (WLAN)) coordinates with another wireless communication device to determine which communication parameter(s) to use in at least one FTM frame exchange. In an example of operation, the wireless communication device includes a communication interface and a processor such that the processor receives, via the communication interface, a fine timing measurement (FTM) request frame from the other wireless communication device. The FTM request frame specifies at least one preferred communication parameter for the at least one FTM frame exchange. The processor then determines, based on the FTM request frame, information related to the at least one preferred communication parameter. The wireless communication device generates and transmits a response to the FTM request frame to the other wireless communication device that confirms or overrides the at least one preferred communication parameter.

20 Claims, 7 Drawing Sheets

(51) Int. Cl.
  *H04B 7/04*    (2006.01)
  *H04B 7/06*    (2006.01)
  *H04W 84/12*   (2009.01)

(52) U.S. Cl.
  CPC ........ *H04B 7/0689* (2013.01); *H04W 56/001* (2013.01); *H04W 84/12* (2013.01)

(56) References Cited

U.S. PATENT DOCUMENTS

| | | | | |
|---|---|---|---|---|
| 2013/0273948 A1* | 10/2013 | Tel-Or | ................. | H04W 88/06 455/500 |
| 2014/0073352 A1* | 3/2014 | Aldana | ..................... | G01S 5/10 455/456.1 |
| 2014/0160959 A1* | 6/2014 | Aldana | ............... | H04L 43/0864 370/252 |
| 2014/0355462 A1* | 12/2014 | Aldana | .................... | G01S 5/00 370/252 |

\* cited by examiner

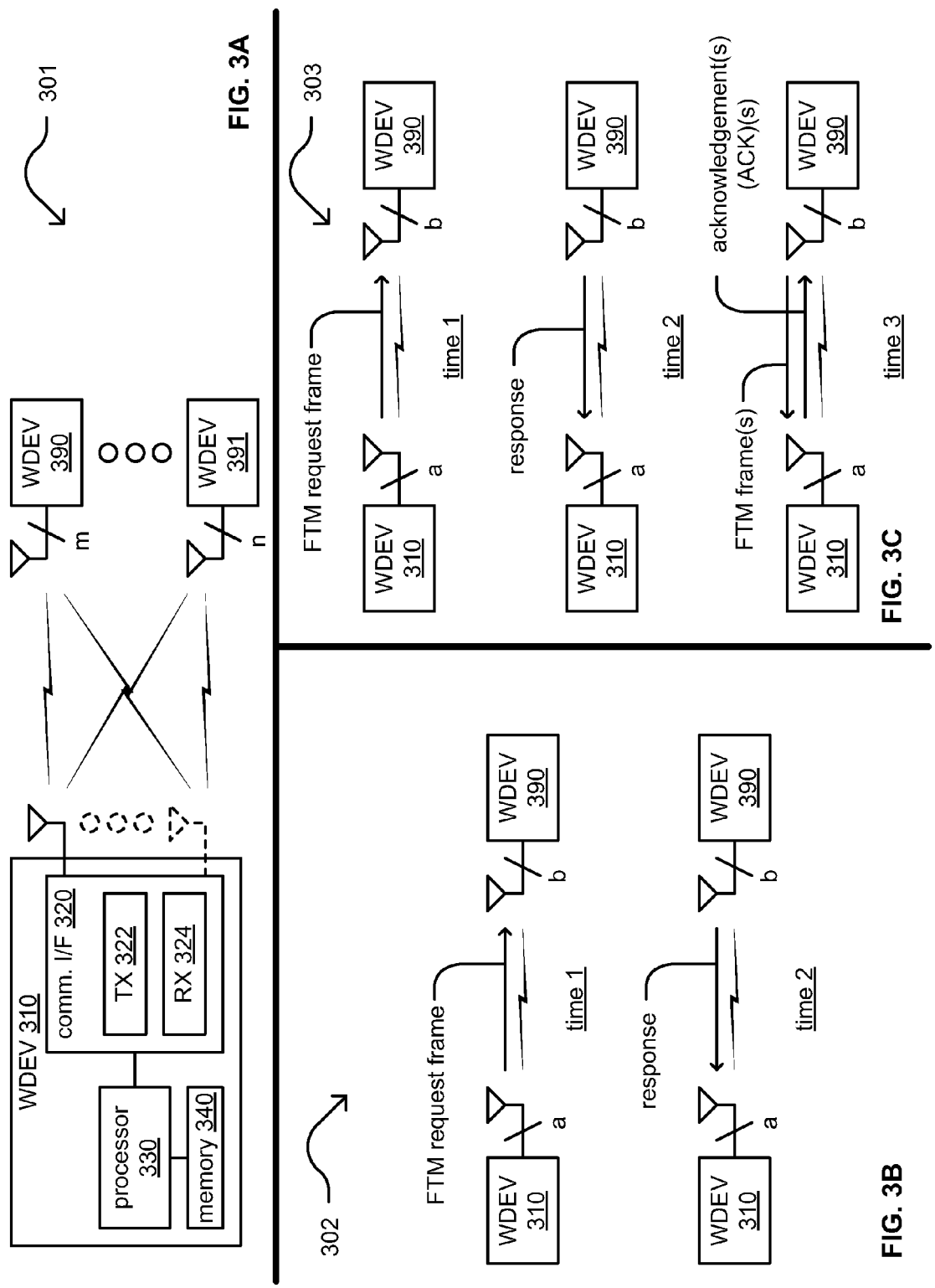

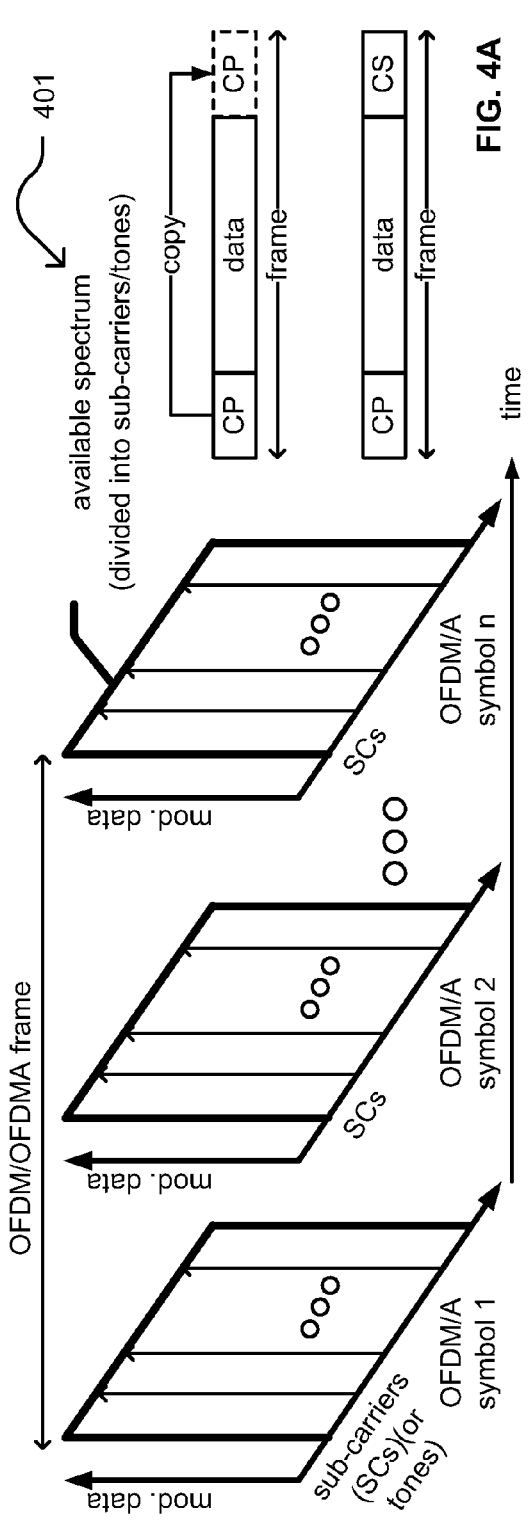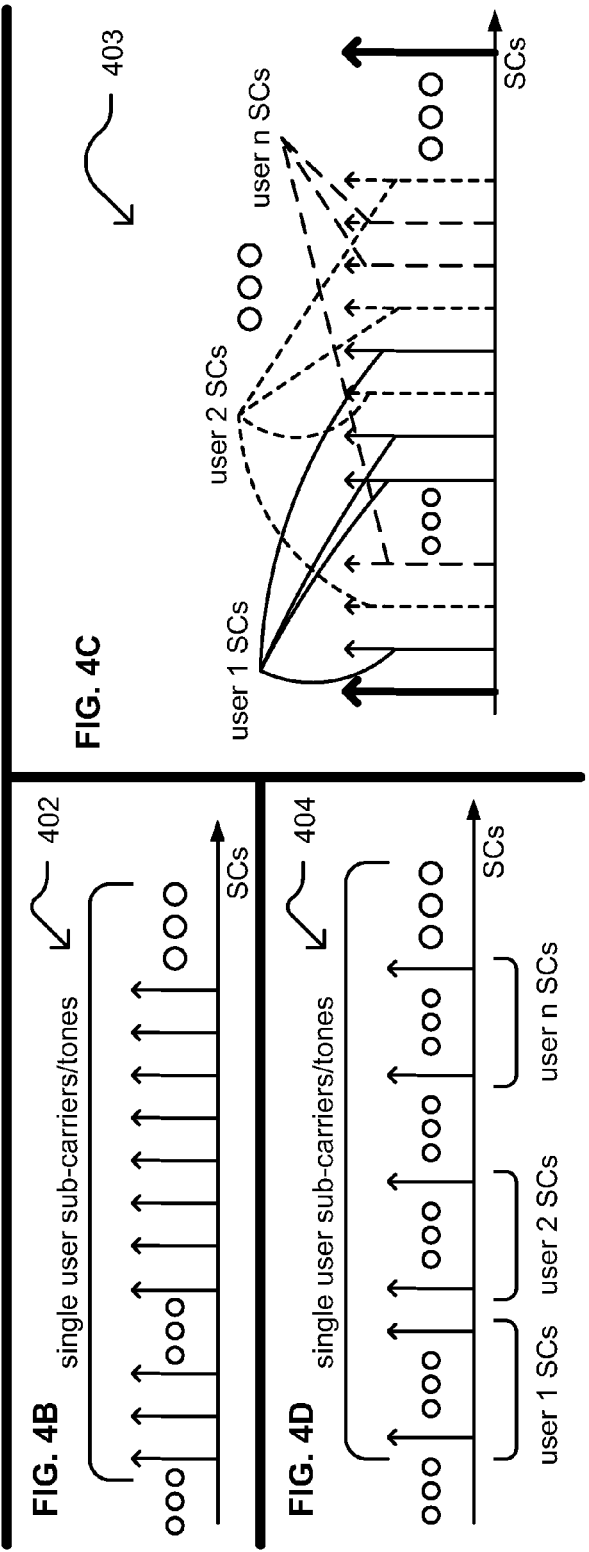
FIG. 4A
FIG. 4B
FIG. 4C
FIG. 4D

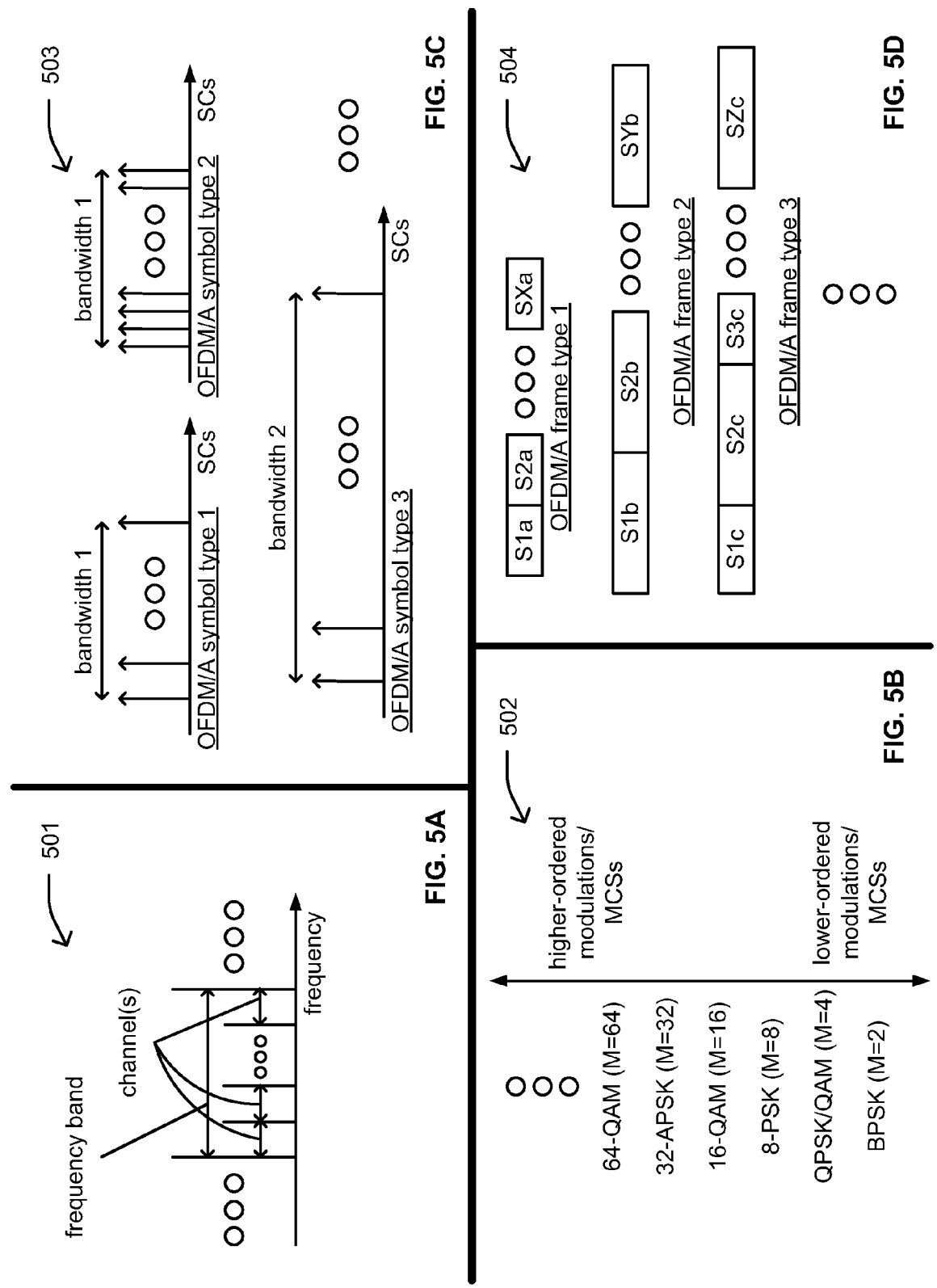

WIRELESS COMMUNICATION FINE TIMING MEASUREMENT PHY PARAMETER CONTROL AND NEGOTIATION

CROSS REFERENCE TO RELATED PATENTS/PATENT APPLICATIONS

Provisional Priority Claims

The present U.S. Utility Patent Application claims priority pursuant to 35 U.S.C. §119(e) to U.S. Provisional App. Ser. No. 61/867,545, entitled "Wireless communication fine timing measurement PHY parameter control and negotiation," filed Aug. 19, 2013, which is hereby incorporated herein by reference in its entirety and made part of the present U.S. Utility Patent Application for all purposes.

BACKGROUND

Technical Field

The present disclosure relates generally to communication systems; and, more particularly, to communication parameter control and negotiation within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

When two or more wireless communication devices communicate with one another, they sometimes do not operate using communication parameters that are known by both or all of the wireless communication devices. As such, a receiving device may be unable to process a transmission from a transmitting device. The transmitting device may perform one or more subsequent retransmissions in order to increase the chance that the receiving device will be able to process the transmission successfully and extract information therein. This process can consume a great deal of time and channel capacity and reduce the overall usage and throughput of the communication medium for other purposes. There does not exist an adequate means in the art by which different devices may coordinate with one another to ensure successful communication there between.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 5A is a diagram illustrating an example of communication parameters that include a frequency band included within a particular frequency range and that includes one or more channels.

FIG. 5B is a diagram illustrating another example of communication parameters that include different types of modulations and/or modulation coding sets (MCSs).

FIG. 5C is a diagram illustrating another example of communication parameters that include different OFDM and/or OFDMA symbol types.

FIG. 5D is a diagram illustrating another example of communication parameters that include different OFDM and/or OFDMA frame types.

DETAILED DESCRIPTION

Figure 1:
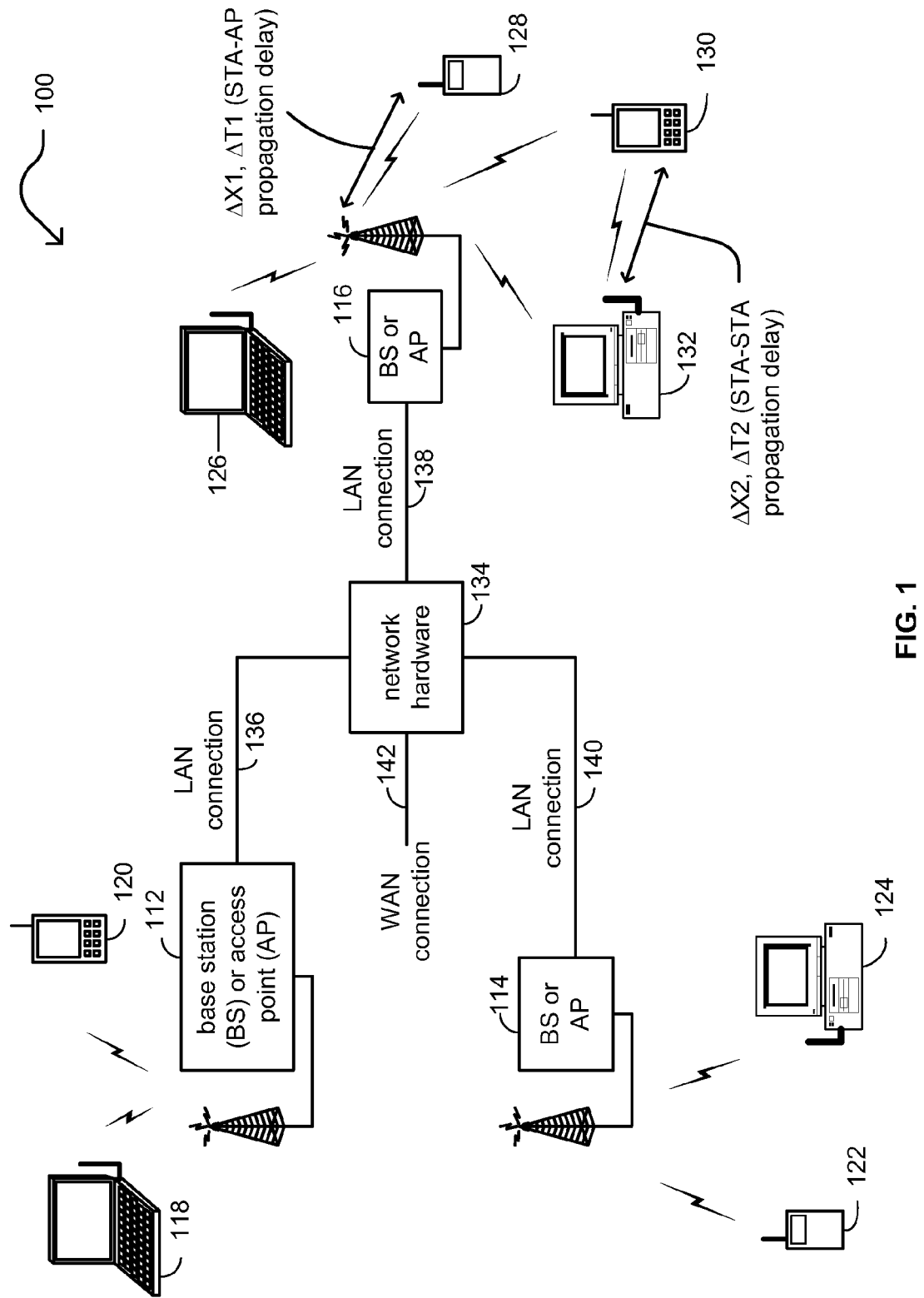
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116. Such communications may be uni-directional or bi-directional between devices. Also, such communications may be uni-directional between devices at one time and bi-directional between those devices at another time.

A device can utilize information related to the communication system in which it operates and/or other devices within the communication system when supporting communications with those other devices within the communication system. For example, a device may adapt its operation with another device based on the propagation delay between itself and the other device (e.g., between access point (AP) 116 and wireless station (STA) 129, or between STA 132 and STA 130). Different means may be used to determine the propagation delay. In one example of operation to determine propagation delay, a device may exchange one or more fine timing measurement (FTM) frames with another device. The devices exchange FTM frames that include information regarding the transmission times (e.g., timestamps) at which the FTM frames and their responses or ACKs have been transmitted and/or received. A given FTM frame can include more than one timestamp. For example, an FTM frame that is transmitted after an initial/first FTM frame may include a first timestamp that indicates the time at which a prior FTM frame was transmitted and a second timestamp that indicates the time at which a response to that prior FTM frame (e.g., an ACK) was received.

A device uses the time related information within the FTM frames, and also may use information maintained locally to the wireless communication device, to determine the propagation delay between itself and the other device. The propagation delay may be used to determine the distance between the device in accordance with ranging operations (e.g., using the propagation delay and the speed of light to determine the distance between the devices). Also, if desired, the propagation delay may be used to determine location of a device (e.g., based on known locations of other devices in conjunction with the distance between the devices, using triangulation and information based on two or more other devices (i.e., three or more in total including the device itself and two or more other devices), etc.).

This disclosure presents a novel physical layer (PHY) parameter control and negotiation process to allow devices to determine very quickly the one or more communication parameters to be used within such an FTM frame exchange. The devices may proceed very quickly into an FTM frame exchange process by determining the one or more communication parameters just before hand using an FTM request frame and a response to the FTM request frame.

In an example operation, any one of the various devices, WDEVs 118-132 and BSs or APs 112-116, may be implemented to include a communication interface and a processor. The processor receives, via the communication interface, a fine timing measurement (FTM) request frame from another wireless communication device. This FTM request frame specifies at least one preferred communication parameter for at least one FTM frame exchange. The processor then processes the FTM request frame to determine the at least one preferred communication parameter. The processor then generates and transmits a response to the FTM request frame (e.g., which may be referred to as an 'FTM response' or generally as a 'response' or a 'response to the FTM request frame') to the other wireless communication device via the communication interface. Note that the response to the FTM request frame may be generated and transmitted using any of a number of different means. For example, the response to the FTM request frame may be a general response. One example of a response to the FTM request frame includes an acknowledgement (ACK) frame. In another example, the response to the FTM request frame may be included within a block acknowledgement (BACK) frame. In another example, the response to the FTM request frame may be an FTM acknowledgement (ACK) frame. In another example, the response to the FTM request frame may be piggybacked onto or included within any other frame transmitted from the wireless communication device to the other wireless communication device via the communication interface. Any desired form of response may be used to generate and transmit the response to the FTM request frame to the other wireless communication device.

The contents of the response to the FTM request frame are dependent upon comparison of the at least one preferred communication parameter included within the FTM request frame and the capability of the wireless communication device that receives the FTM request frame. For example, if the device is able to support subsequent communications using the at least one preferred communication parameter, such as based on a favorable comparison of the at least one preferred communication parameter with a capability of the wireless communication device, then the device generates the response to the FTM request frame to include information to confirm the at least one preferred communication parameter for the at least one FTM frame exchange.

Alternatively, if the device is unable (or prefers not) to support subsequent communications using the at least one preferred communication parameter, such as based on an unfavorable comparison of the at least one preferred communication parameter with a capability of the wireless communication device, then the device generates the response to the FTM request frame to include information to override the at least one preferred communication parameter for the at least one FTM frame exchange. In this instance, the response to the FTM request frame will include information to suggest or specify at least one other preferred communication parameter for the at least one FTM frame exchange.

In another alternative example, if the device is unable (or prefers not) to support subsequent communications using the at least one preferred communication parameter, the wireless communication device can cancel the FTM process entirely and optionally seek yet another different wireless communication device with which to perform the FTM process.

Subsequently, the device and the other device can perform an FTM frame exchange using the at least one preferred communication parameter or the at least one other preferred communication parameter agreed-upon in the PHY parameter control and negotiation process.

In another example operation, the processor transmits, via the communication interface, a FTM request frame to the other wireless communication device. The FTM request frame specifies at least one preferred communication parameter for at least one FTM frame exchange. Then, the processor receives, via the communication interface, a response to the FTM request frame from the other wireless communication device. The processor then processes the response to the FTM request frame to determine whether the response to the FTM request frame confirms or overrides the at least one preferred communication parameter for the at least one FTM frame exchange. The response to the FTM request frame specifies at least one other preferred communication parameter when the response to the FTM request frame overrides the at least one preferred communication parameter.

Subsequently, the device and the other device can perform an FTM frame exchange. The FTM frame exchange is based on the at least one preferred communication parameter when the response to the FTM request frame confirms the at least one preferred communication parameter. Alternatively, the FTM frame exchange is based on the at least one other preferred communication parameter when the response to the FTM request frame overrides the at least one preferred communication parameter.

Figure 2:
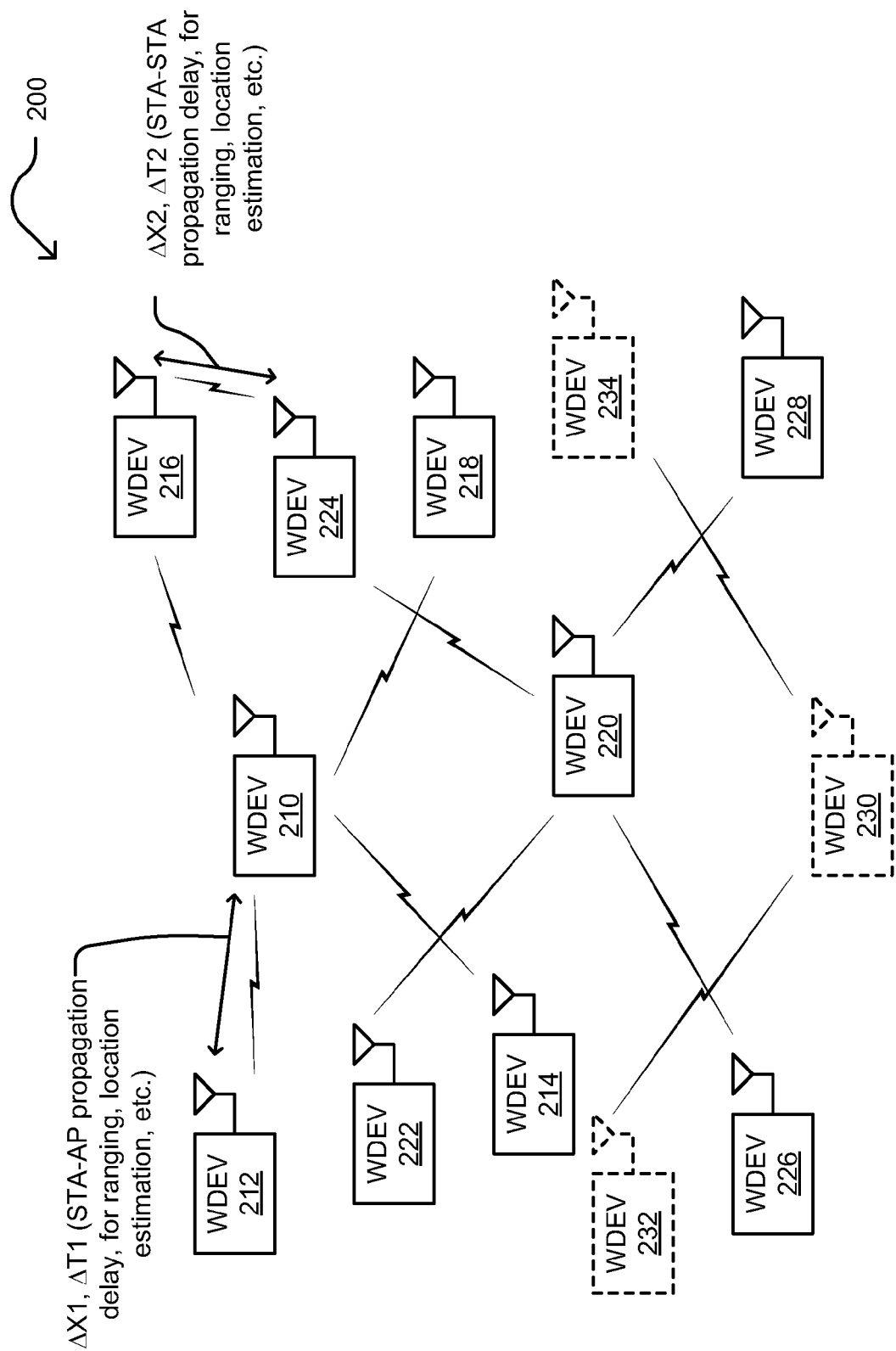
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

Within such congested or highly dense implementations, a device may communicate with one another more effectively with another device when knowing specific information regarding the communication pathway between itself and the other device. One type of information includes determining the propagation delay between devices. An FTM frame exchange may be used to determine the propagation delay. For example, WDEV 210 (e.g., AP or an AP-operative STA) may perform a PHY parameter control and negotiation process with WDEV 212 (STA) to determine the propagation delay between those devices. In another example, WDEV 216 (STA) may perform a PHY parameter control and negotiation process with WDEV 224 (STA) to determine the propagation delay between those devices.

When such information specific to the communication link between two devices is known, such as propagation delay, those two devices may tailor their subsequent communications to achieve better performance (e.g., lower error rates, higher throughput, etc.).

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably). The wireless communication device 310 also includes a processor 330, and an associated memory 340, to execute various operations including interpreting at least one packet or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one packet or frame (e.g., WDEV 390 may include m antennae, and WDEV 391 may include n antennae).

In an example operation, any one of the various devices, processor 330 receives, via the communication interface 320, a FTM request frame from device 390. This FTM request frame specifies at least one preferred communication parameter for at least one FTM frame exchange. The processor 330 then processes the FTM request frame to determine the at least one preferred communication parameter. The processor 330 then generates a response to the FTM request frame and transmits the response to the FTM request frame to the other device 390 via the communication interface 320.

The contents of the response to the FTM request frame are dependent upon comparison of the at least one preferred communication parameter included within the FTM request frame and the capability of the device 310 that receives the FTM request frame. For example, if the device is able to support subsequent communications using the at least one preferred communication parameter, such as based on a favorable comparison of the at least one preferred communication parameter with a capability of the device 310, then the device 310 generates the response to the FTM request frame to include information to confirm the at least one preferred communication parameter for the at least one FTM frame exchange.

Alternatively, if the device 310 is unable (or prefers not) to support subsequent communications using the at least one preferred communication parameter, such as based on an unfavorable comparison of the at least one preferred communication parameter with a capability of the device 310, then the device 310 generates the response to the FTM request frame to include information to override the at least one preferred communication parameter for the at least one FTM frame exchange. In this instance, the response to the FTM request frame will include information to suggest or specify at least one other preferred communication parameter for the at least one FTM frame exchange.

In another example operation, the processor 330 transmits, via the communication interface 320, a FTM request frame to the other device 390. The FTM request frame specifies at least one preferred communication parameter for at least one FTM frame exchange. Then, the processor 330 receives, via the communication interface 320, a response to the FTM request frame from the other device 390. The processor 330 then processes the response to the FTM request frame to determine whether the response to the FTM request frame confirms or overrides the at least one preferred communication parameter for the at least one FTM frame exchange. The response to the FTM request frame specifies at least one other preferred communication parameter when the response to the FTM request frame overrides the at least one preferred communication parameter.

Regardless of which manner is used to perform the PHY parameter control and negotiation process, subsequently, the device 310 and the other device 390 perform an FTM frame exchange using the at least one preferred communication parameter or the at least one other preferred communication parameter agreed-upon in the PHY parameter control and negotiation process.

FIG. 3B is a diagram illustrating another example 302 of communication between wireless communication devices. The communication interface 320 of WDEV 310 is configured to receive a first signal from a first other wireless communication device (e.g., WDEV 390). At or during a first time (time 1), device 310 transmits an FTM request frame to device 390. At or during a second time (time 2), device 310 receives a response to the FTM request frame from device 390. Note that this process could be reversed in another example of operation. For example, instead of the process shown in the diagram, in another mode of operation, at or during a first time (time 1), device 310 receives an FTM request frame from device 390. At or during a second time (time 2), device 310 transmits a response to the FTM request frame to device 390. In general, device 310 and 390 perform a PHY parameter control and negotiation process to determine preferred communication parameter(s) for use in a FTM frame exchange.

FIG. 3C is a diagram illustrating another example 303 of communication between wireless communication devices. At or during a first time (time 1), device 310 transmits an FTM request frame to device 390. At or during a second time (time 2), device 310 receives a response to the FTM request frame from device 390. At the first (time 1) and the second time (time 2), device 310 and 390 perform a PHY parameter control and negotiation process. At or during a third time (time 3), device 390 transmits an FTM frame that includes timestamps to device 310. This is achieved by the device 390 firstly transmitting one or more FTM frames to the device 310, and secondly the device 310 transmitting one or more acknowledgements (e.g., one or more ACKs) to the device 390. In general, device 310 and 390 perform a PHY parameter control and negotiation process before performing an FTM frame exchange using preferred communication parameter(s) agreed-upon in the PHY parameter control and negotiation process. In an alternative example, note that time 2 and time 3 can merge into a single time in which the device 390 piggybacks its response to the FTM request frame onto the first FTM frame that device 390 transmits to device 310.

At or during a third time (time 3), device 310 and 390 perform a PHY parameter control and negotiation process (by the device 390 transmitting one or more FTM frames to the device 310, and the device 310 transmitting one or more responses (e.g., one or more ACKs) to the device 390) before performing an FTM frame exchange using preferred communication parameter(s) agreed-upon in the PHY parameter control and negotiation process. In general, device 310 and 390 perform a PHY parameter control and negotiation process before performing an FTM frame exchange using preferred communication parameter(s) agreed-upon in the PHY parameter control and negotiation process.

Note that the FTM frame exchange may be performed in a number of different ways. In one example of FTM frame exchange operation, the processor 330 of device 310 transmits, via the communication interface 320, an FTM frame to the device 390 that includes timestamps for use by the device 390 to determine a propagation delay between the device 310 and the device 390. The device 390 may transmit a response to the 310 based on the FTM frame, and the device 310 may also transmit other FTM frames to the device 390 that include other respective timestamps for use by the device 390 to determine, refine, update, etc. a propagation delay between the device 310 and the device 390.

In another example of FTM frame exchange operation (e.g., in which the device 390 is an initiating device and device 310 is a responding device), the processor 330 of device 390 receives, via the communication interface 320, an FTM frame from the device 310 that includes timestamps. Note that the FTM frame can include more than one timestamp. For example, an FTM frame that is transmitted after an initial/first FTM frame may include a first timestamp that indicates the time at which a prior FTM frame was transmitted from device 310 and a second timestamp that indicates the time at which a response to that prior FTM frame (e.g., an ACK) was received. The processor 330 of device 390 then uses these timestamps included in the FTM frame as well as information known by the processor 330 of device 390 regarding the times of receipt of the FTM frame at the device 390 as well as the transmission time of a response/ACK to the FTM frame to determine a propagation delay between the device 310 and the other device 390.

Referring again to the diagram, after device 390 receives the FTM request frame, the processor 330 of device 390 then transmits, via the communication interface 320 of device 390, a response to the FTM request frame to the device 310. In certain examples of operation, the processor 330 of device 390 then receives, via the communication interface 320, another one or more FTM frame from the device 310 that includes additional timestamps. The processor 330 of device 390 then determines a propagation delay between the device 310 and the other device 390 based on the timestamps included in the FTM frame and the other one or more FTM frame (e.g., in first and second FTM frames) as well as internal information to determine a propagation delay between the device 310 and the other device 390.

In an example of operation using information related to the determined propagation delay between the device 310 and the device 390, the processor 330 of either device 310 or device 390 uses the propagation delay (e.g., that is determined by device 390) and selects at least one beamforming operational parameter based on the propagation delay. Then, the processor 330 of either device 310 or device 390 supports, via the communication interface 320 of either device 310 or device 390, subsequent communications based on the at least one beamforming operational parameter.

Note also that subsequent communications may be after completion of the exchange of FTM request frame and the response to the FTM request frame that is followed by the FTM frame exchange operation. For example, the processor 330 of either device 310 or device 390 supports, via the communication interface 320 of either device 310 or device 390, subsequent communications with the device 390 after completion of the at least one FTM frame exchange. These subsequent communications may be supported based on any desired communication parameter(s) such as at least one additional communication parameter that is supported by both the wireless communication device and the other wireless communication device.

The exchange of FTM request frame and the response to the FTM request frame operate to negotiate which communication parameters are to be used for the FTM frame exchange operation. Examples of communication parameters may include any one of a modulation coding set (MCS), a modulation type, a forward error correction (FEC) coding type, an error correction code (ECC) type, an orthogonal frequency division multiplexing (OFDM) symbol type, an OFDM frame type, an orthogonal frequency division multiple access (OFDMA) symbol type, an OFDMA frame type, a frame format, a channel bandwidth, at least one channel among a plurality of channels, a frequency band that contains one or more channels, a data rate, or a multiple-input-multiple-output (MIMO) configuration (e.g., in a beamforming, multi-antennae, multi-path, multi-channel, etc.). Some examples may allow for specification of only a subset of such communication parameters and yet pre-define others. For example, one example of operation may specify that FTM frames are to be sent only in a single transmit chain (e.g., using only a single predefined MIMO configuration). Generally speaking, the PHY parameter control and negotiation process operates to determine any one or more desired communication parameters to be used for the FTM frame exchange operation.

FIGS. 4A, 4B, 4C, 4D, 5C and 5D describe various communication parameters related to an orthogonal frequency division multiplexing (OFDM) symbol type, an OFDM frame type, an orthogonal frequency division multiple access (OFDMA) symbol type, an OFDMA frame type, and a frame format.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. This example 404 where the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 5A is a diagram illustrating an example 501 of communication parameters that include a frequency band included within a particular frequency range and that includes one or more channels. Certain communication protocols may specify particular frequency bands within the radio frequency (RF) spectrum. For example, some communication protocols specify use of frequency band centered around 2.4 GHz, 3.6 GHz, 4.9 GHz, 5 GHz, and/or 5.9 GHz such as used by certain wireless local area network (WLAN) related communication standards. Alternatively, different frequency bands such as those centered around 60 GHz or other frequency bands may be used.

Each frequency band may be further sub-divided into one or more channels of any desired bandwidth (e.g., 20 MHz, 40 MHz, 80 MHz, 160 MHz, and/or any other channel bandwidth). Note that different channels within a given frequency band ma have the same or different channel bandwidths. Note also that different channel within a frequency band may be located at different center frequency.

FIG. 5B is a diagram illustrating another example 502 of communication parameters that include different types of modulations and/or modulation coding sets (MCSs). Information may be modulated to generate discrete-valued modulation symbols using various modulation coding techniques. Examples of such modulation coding techniques may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). Generally, data within a packet may be modulated using a relatively higher-ordered modulation/modulation coding sets (MCSs) than is used for modulating SIG information. Relatively lower-ordered modulation/MCS may be used for the SIG information to ensure reception by a recipient device (e.g., being relatively more robust, easier to demodulate, decode, etc.).

FIG. 5C is a diagram illustrating another example 503 of communication parameters that include different OFDM and/or OFDMA symbol types. Different OFDM and/or OFDMA symbol types may have different numbers of sub-carriers, span different bandwidths, different spacing between the sub-carriers, etc. Note that different OFDM and/or OFDMA symbols within a frame may have different characteristics from other OFDM and/or OFDMA symbols within the same frame or a different frame.

FIG. 5D is a diagram illustrating another example 504 of communication parameters that include different OFDM and/or OFDMA frame types. Different OFDM and/or OFDMA frames may have different numbers of symbols, different durations or lengths, different symbols therein that have different bandwidths, etc. Note that different OFDM and/or OFDMA frames may have different characteristics from other OFDM and/or OFDMA frames.

Many of these prior diagrams describe examples of communication parameters that may be determined within a PHY parameter control and negotiation process that is performed before performing an FTM frame exchange using the preferred communication parameter(s) agreed-upon in the PHY parameter control and negotiation process.

Figure 6:
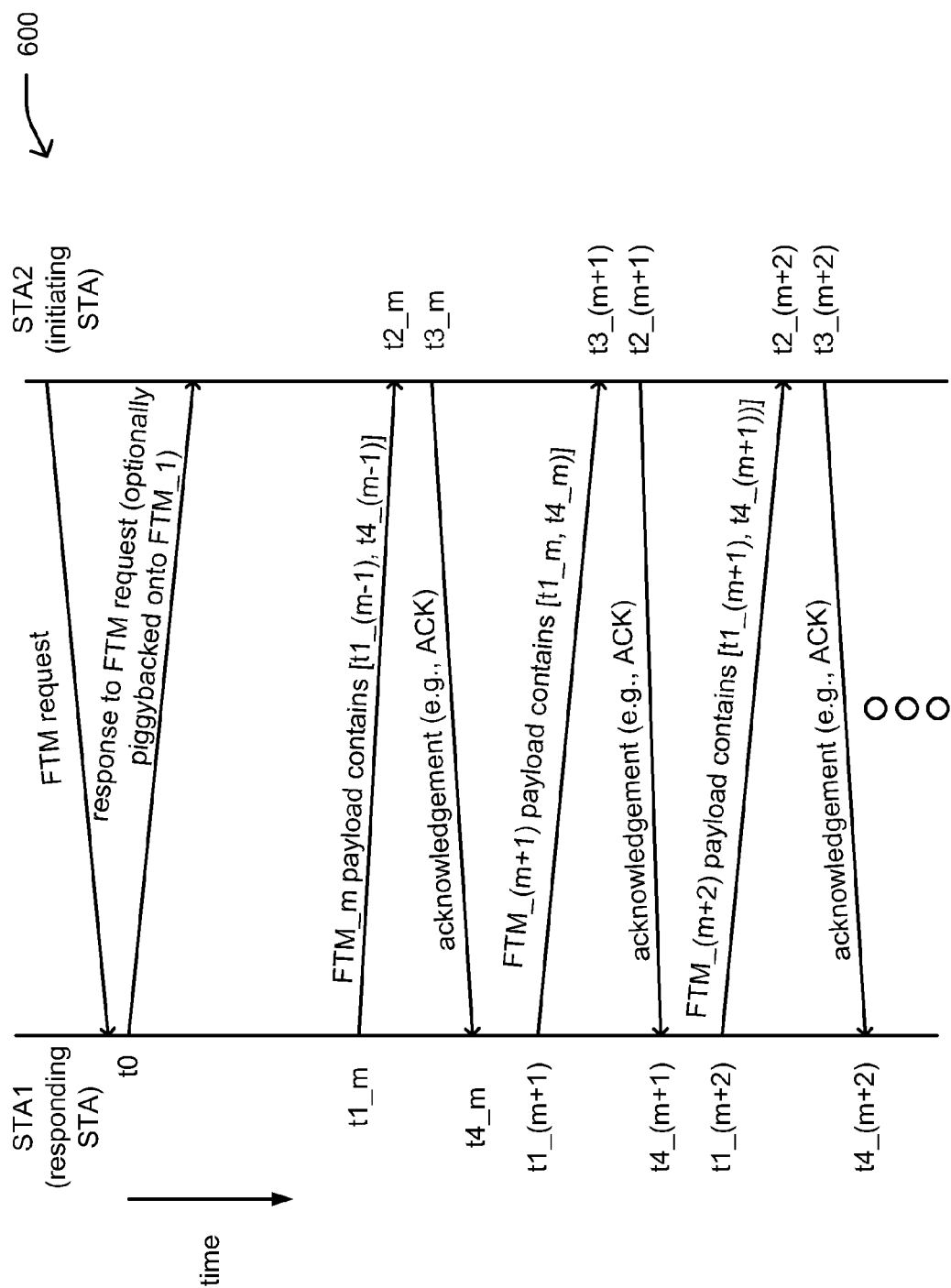
FIG. 6 is a diagram illustrating an example of fine timing measurement (FTM) frame exchange that is preceded by a FTM request frame and a response to the FTM request frame.

FIG. 6 is a diagram illustrating an example of fine timing measurement (FTM) frame exchange that is preceded by a FTM request frame and a response to the FTM request frame. Existing approaches to perform such Fine Timing Measurement (FTM) can be less than optimal and/or provide less than accurate measurement. This disclosure presents modifications and enhancements to the Fine Timing Measurement (FTM) to provide for improved performance.

In an example of operation, a wireless communication device performs an FTM frame exchange using the preferred communication parameter(s) agreed-upon in the PHY parameter control and negotiation process. The methods disclosed herein enable the wireless communication devices (e.g., wireless local area network (WLAN) capable devices) to set the PHY transmit (TX) transmission parameters for FTM transmissions when using the two features. Also, this disclosure uses the Fine Timing Measurement feature as an example to illustrate certain operations, and this can also be applied similarly apply to the Timing Measurement feature in the same fashion.

The Fine Timing Measurement (FTM) allows a wireless station (STA) (e.g., a wireless communication device) to accurately measure the Round Trip Time (RTT) between it (e.g., STA2, shown as located on right hand side) and another STA (e.g., STA1, shown as located on left hand side). Generally, an initiating wireless communication device (e.g., STA2) transmits a FTM request to a responding wireless communication device (e.g., STA1). The responding wireless communication device (e.g., STA1) then generates and transmits a response to the FTM request frame (e.g., which may be referred to as an 'FTM response' or generally as a 'response' or a 'response to the FTM request frame') to the initiating wireless communication device (e.g., STA2). Note that the response to the FTM request frame may be generated and transmitted using any of a number of different means. In one example, the response to the FTM request may be piggybacked within an FTM frame (e.g., FTM_1).

In another example, the response to the FTM request frame may be a general response. One example of a response to the FTM request frame includes an acknowledgement (ACK) frame. In another example, the response to the FTM request frame may be included within a block acknowledgement (BACK) frame. In yet another example, the response to the FTM request frame may be an FTM acknowledgement (ACK) frame. In another example, the response to the FTM request frame may be piggybacked onto or included within any other frame (e.g., besides an FTM frame) transmitted from the wireless communication device to the other wireless communication device via the communication interface. Any desired form of response may be used to generate and transmit the response to the FTM request frame to the other wireless communication device.

The initiating wireless communication device (e.g., STA2) and the responding wireless communication device (e.g., STA1) make various subsequent frame exchanges (e.g., FTM frames) of FTM_m, FTM_(m+1), FTM_(m+2), etc. and responses to the FTM frames/acknowledgements (ACKs). The responding wireless communication device (e.g., STA1) transmits the FTM_m frame, which includes t1(m−1) and t4_(m−1) in its payload, after transmitting a response to the FTM request to the initiating wireless communication device (e.g., STA2) in response to the FTM request received from the initiating wireless communication device (e.g., STA2). The time t1_m corresponds to the transmission time of the $m^{th}$ FTM frame captured by the responding STA1, the time t2_m corresponds to the reception time of the $m^{th}$ FTM frame captured by the initiating STA2, the time t3_m corresponds to the transmission time of the ACK frame in response to the $m^{th}$ FTM frame captured by the initiating STA2, and t4_m corresponds to the reception time of the ACK frame that is in response to the $m^{th}$ FTM frame captured by the responding STA1.

The responding wireless communication device (e.g., STA1) provides additional FTM frames (e.g., $(m+1)^{th}$ FTM frame, denoted as FTM_(m+1), $(m+2)^{th}$ FTM frame, denoted as FTM_(m+2), etc.) to the initiating wireless communication device (e.g., STA2) that indicate additional respective transmission times of the corresponding FTM frames and the reception times the corresponding ACKs. The initiating wireless communication device (e.g., STA2) transmits additional ACKs in response to these additional received FTM frames and captures additional respective reception times of the corresponding FTM frames and transmission times of the corresponding ACK.

Among other deficiencies of other approaches that perform FTM frame exchanges, they have no mechanism to allow STAs to negotiate physical layer (PHY) transmit (referred to as TX, Tx, or tx) parameters for transmitting FTM frames used in the subsequent FTM process. The initiating wireless communication device (e.g., STA2) may be affected by interferer that is not detected by responding wireless communication device (e.g., STA1) and that could limit ability of initiating wireless communication device (e.g., STA2) to properly decode FTM frames sent by responding wireless communication device (e.g., STA1). Rate fallback mechanisms exist to address this problem but typically rely on missed acknowledgement (ACK) to detect communication problems. Although this mechanism may converge to a set of PHY TX parameters that allow proper communication between responding wireless communication device (e.g., STA1) and initiating wireless communication device (e.g., STA2), it may increase the number of FTM frames which responding wireless communication device (e.g., STA1) needs to transmit.

Also, although initiating wireless communication device (e.g., STA2) may be able to use a full 80 MHz bandwidth channel for communicating with responding wireless communication device (e.g., STA1), it may not want to do so for various reasons. For example, if the responding wireless communication device (e.g., STA1) is simultaneously communicating with another wireless communication device (e.g., STA3) on a 20 MHz bandwidth subchannel within the 80 MHz bandwidth channel. In this case, the initiating wireless communication device (e.g., STA2) may wish to direct responding wireless communication device (e.g., STA1) to send FTM's on 20 MHz bandwidth subchannel that does not interfere with the other wireless communication device (e.g., STA3). The desired accuracy levels for the timestamp value might not be achieved due to the lack of desired PHY parameters communications between the two STAs.

This disclosure presents a novel way to allow an initiating wireless communication device (e.g., STA2) to indicate to responding wireless communication device (e.g., STA1) its preference for PHY TX parameters for FTM frames transmitted by responding wireless communication device (e.g., STA1). Some exemplary parameters can include:

1. PHY_tx_mcs: select rate for transmission
2. PHY_tx_bandwidth: selects bandwidth for transmission
3. PHY_tx_format: selects the format for transmission, e.g., 20 MHz non-High Throughput (HT) PLCP Protocol Data Unit (PPDU), 40 MHz non-HT duplicate PPDU, 80 MHz non-HT duplicate PPDU, 20 MHz Very High Throughput (VHT) PPDU, 40 MHz VHT VHT PPDU, 80 MHz VHT PPDU
4. PHY_tx_channel: selects channel for transmission
5. PHY_tx_freq_band: selects the frequency band for transmission These parameters can be conveyed explicitly as fields or information in the FTM request frame or implicitly by the PHY TX parameters selected by initiating wireless communication device (e.g., STA2) to transmit FTM request. If initiating wireless communication device (e.g., STA2) has no preference for one particular PHY TX parameter, it can inform responding wireless communication device (e.g., STA1) by setting the corresponding field for the parameter to some default value (for example 0), or omit the communication of the corresponding parameters to responding wireless communication device (e.g., STA1).

Also, this disclosure presents novel ways to enable a responding wireless communication device (e.g., STA1) to select PHY TX parameters for FTM transmissions. The responding wireless communication device (e.g., STA1) selects PHY TX parameters within its capabilities that meet as many as requested parameters from initiating wireless communication device (e.g., STA2). For example, if the initiating wireless communication device (e.g., STA2) requests the responding wireless communication device (e.g., STA1) to transmit 80 MHz frames but the responding wireless communication device (e.g., STA1) only supports 40 MHZ bandwidth, then the responding wireless communication device (e.g., STA1) shall transmit FTM frames in 40 MHz bandwidth.

This disclosure also presents a novel way to enable a responding wireless communication device (e.g., STA1) to indicate to initiating wireless communication device (e.g., STA2) its preference for PHY TX parameters for the transmissions of response (e.g., ACK) frames corresponding to the FTM frames. Some exemplary parameters can include:

1. PHY_tx_mcs: select rate for transmission
2. PHY_tx_bandwidth: selects bandwidth for transmission
3. PHY_tx_format: selects the format for transmission, e.g., 20 MHz non-HT PPDU, 40 MHz non-HT duplicate PPDU, 80 MHz non-HT duplicate PPDU, 20 MHz VHT PPDU, 40 MHz VHT PPDU, 80 MHz VHT PPDU These parameters can be conveyed explicitly as fields or Information Element (IE) in a separate FTM Response frame. Alternatively, these parameters can be piggybacked to the FTM frames (by using reserved bits, fields, or including a new IE).

These parameters can also be conveyed implicitly by the PHY TX parameters selected by responding wireless communication device (e.g., STA1) to transmit FTM frames.

If the responding wireless communication device (e.g., STA1) has no preference for one particular PHY TX parameter, it can inform initiating wireless communication device (e.g., STA2) by setting the corresponding field for the parameter to some default value (for example 0), or omit the communication of the corresponding parameter to initiating wireless communication device (e.g., STA2).

This disclosure also presents a novel way to enable responding initiating wireless communication device (e.g., STA2) to select PHY TX parameters for the transmissions of response (e.g., ACK) frames corresponding to the FTM frames. The initiating wireless communication device (e.g., STA2) selects PHY TX parameters within its capabilities that meet as many as requested parameters from responding wireless communication device (e.g., STA1).

In addition, this disclosure also presents a novel way to allow for the exact parameters exchanged between initiating wireless communication device (e.g., STA2) and responding wireless communication device (e.g., STA1) to be different from the parameters aforementioned (e.g., Tx_PHY_mcs, Tx_PHY_BW, Tx_PHY_channel, Tx_PHY_freq_band), without a loss of generality. Some variants of these exemplary parameters serve the same purposes as described above.

The exact data structure (e.g., use the fields of frame, an IE inside a frame, etc.) placed to convey the Tx PHY transmission parameters can be different from aforementioned, without a loss of generality. Some variants of the exemplary frames serve the same purpose as describe above. Alternatively, the TX PHY transmission parameters can be included with/piggybacked onto other frames that are transmitted for other purpose.

This disclosure presents a novel protocol that can provide enhancements to any Fine Timing Measurement feature and/or Timing Measurement feature performed between two or more wireless communication devices.

Figures 7A, 7B:
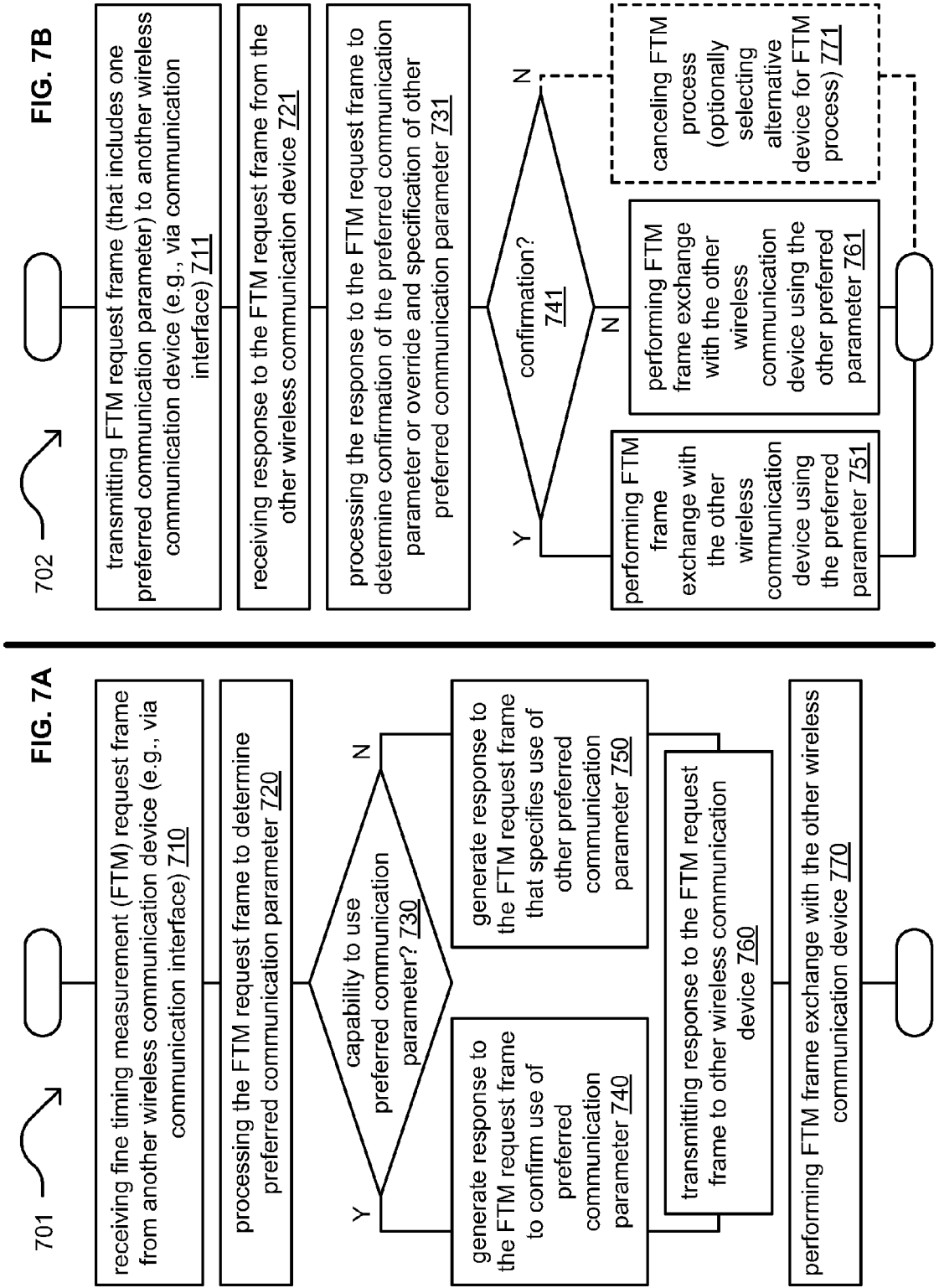
FIG. 7A is a diagram illustrating an embodiment of a method for execution by at least one wireless communication device.
FIG. 7B is a diagram illustrating another embodiment of a method for execution by at least one wireless communication device.

FIG. 7A is a diagram illustrating an embodiment of a method 701 for execution by at least one wireless communication device. The method 701 begins by receiving a fine timing measurement (FTM) request frame from another wireless communication device (e.g., via a communication interface of the wireless communication device) (block 710). The FTM request frame specifies at least one preferred communication parameter for at least one FTM frame exchange.

The method 701 continues by processing the FTM request frame to determine the at least one preferred communication parameter (block 720). The method 701 then operates by determining whether the wireless communication device can operate (e.g., has capability) using the at least one preferred communication parameter (block 730).

When there is a favorable comparison of the at least one preferred communication parameter with the capability of the wireless communication device, the method 701 continues by generating a response to the FTM request frame to include information to confirm the at least one preferred communication parameter for the at least one FTM frame exchange (block 740).

When there is an unfavorable comparison of the at least one preferred communication parameter with the capability of the wireless communication device, the method 701 continues by generating the response to the FTM request frame to include information to override and/or specify at least one other preferred communication parameter for the at least one FTM frame exchange (block 750).

The method 701 continues by transmitting (e.g., via the communication interface of the wireless communication device) the response to the FTM request frame to the other wireless communication device (block 760). The method 701 then operates by performing the FTM frame exchange with the other wireless communication device (block 770).

Note that there may also be some instances when the wireless communication device can (e.g., has the capability to do so), but chooses not to operate using the at least one preferred communication parameter; such situations may be treated as an unfavorable comparison of the at least one preferred communication parameter with the capability of the wireless communication device.

FIG. 7B is a diagram illustrating another embodiment of a method 702 for execution by at least one wireless communication device. The method 702 begins by transmitting (e.g., via a communication interface of the wireless communication device), a FTM request frame to another wireless communication device (block 711). The FTM request frame specifies at least one preferred communication parameter for at least one FTM frame exchange. The method 702 continues by receiving (e.g., via the communication interface) a response to the FTM request frame from the other wireless communication device (block 721).

The method 702 then operates by processing the response to the FTM request frame to determine whether the response to the FTM request frame confirms or overrides the at least one preferred communication parameter for the at least one FTM frame exchange (block 731). The response to the FTM request frame specifies at least one other preferred communication parameter when the response to the FTM request frame overrides the at least one preferred communication parameter.

When there is confirmation (e.g., a favorable indication to use the at least one preferred communication parameter within the response to the FTM request frame) as determined in block 741, the method 702 continues by performing the at least one FTM frame exchange (e.g., via the communication interface) with the other wireless communication device based on the at least one preferred communication parameter (block 751).

Alternatively, when there is not confirmation or an override (e.g., an unfavorable indication to use the at least one preferred communication parameter within the response to the FTM request frame) as determined in block 741, the method 702 continues by performing the at least one FTM frame exchange (e.g., via the communication interface) with the other wireless communication device based on the at least one other preferred communication parameter (block 761).

In another alternative example of operation, when there is not confirmation or an override (e.g., an unfavorable indication to use the at least one preferred communication parameter within the response to the FTM request frame) as determined in block 741, the method 702 may alternatively continue by canceling the FTM process entirely and/or optionally seek yet another different wireless communication device with which to perform the FTM process (block 771).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one or more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor configured to:
receive, via the communication interface, a fine timing measurement (FTM) request frame from another wireless communication device, wherein the FTM request frame specifies a plurality of preferred physical layer (PHY) communication parameters for at least one FTM frame exchange, wherein the plurality of preferred PHY communication parameters includes a modulation coding set (MCS), a frame format, a channel bandwidth, at least one channel among a plurality of channels, and a frequency band that contains one or more channels;
process the FTM request frame to determine the plurality of preferred PHY communication parameters that is specified within a field of the FTM request frame;
transmit, via the communication interface, a response to the FTM request frame to the another wireless communication device, wherein the response includes information to confirm the plurality of preferred PHY communication parameters for the at least one FTM frame exchange based on a favorable comparison of the plurality of preferred PHY communication parameters that is specified within the field of the FTM request frame with a capability of the wireless communication device, and wherein the response includes information that specifies at least one other preferred PHY communication parameter for the at least one FTM frame exchange based on an unfavorable comparison of the plurality of preferred PHY communication parameters with the capability of the wireless communication device;
perform the at least one FTM frame exchange with the another wireless communication device using the plurality of preferred PHY communication parameters based on the favorable comparison of the plurality of preferred PHY communication parameters that is specified within the field of the FTM request frame with the capability of the wireless communication device or using at least one other preferred PHY communication parameter, based on the unfavorable comparison of the plurality of preferred PHY communication parameters that is specified within the field of the FTM request frame with the capability of the wireless communication device; and
adapt operation of subsequent communications with the another wireless communication device based on result of the at least one FTM frame exchange with the another wireless communication device.

2. The wireless communication device of claim 1, wherein the processor is further configured to:
transmit, via the communication interface, an FTM frame to the another wireless communication device that includes a plurality of timestamps for use by the another wireless communication device to determine a propagation delay between the wireless communication device and the another wireless communication device.

3. The wireless communication device of claim 1, wherein the processor is further configured to:
receive, via the communication interface, an FTM frame from the another wireless communication device that includes a plurality of timestamps; and
determine a propagation delay between the wireless communication device and the another wireless communication device based, at least in part, on the plurality of timestamps.

4. The wireless communication device of claim 1, wherein the processor is further configured to:
receive, via the communication interface and from the another wireless communication device, a propagation delay between the wireless communication device and the another wireless communication device;
select at least one beamforming operational parameter based on the propagation delay; and
support, via the communication interface, subsequent communications with the another wireless communication device based on the at least one beamforming operational parameter.

5. The wireless communication device of claim 1, wherein the processor is further configured to:
support, via the communication interface, subsequent communications with the another wireless communication device after completion of the at least one FTM frame exchange based on at least one additional PHY communication parameter that is supported by both the wireless communication device and the another wireless communication device.

6. The wireless communication device of claim 1, wherein the plurality of preferred PHY communication parameter or the at least one other preferred PHY communication parameter also includes at least one of:
a modulation type;
a forward error correction (FEC) coding type;
an error correction code (ECC) type;
an orthogonal frequency division multiplexing (OFDM) symbol type;
an OFDM frame type;
an orthogonal frequency division multiple access (OFDMA) symbol type;
an OFDMA frame type;
a data rate; or
a multiple-input-multiple-output (MIMO) configuration.

7. The wireless communication device of claim 1 further comprising:
an access point (AP), wherein the another wireless communication device includes a wireless station (STA).

8. The wireless communication device of claim 1 further comprising:
a wireless station (STA), wherein the another wireless communication device includes another STA.

9. A wireless communication device comprising:
a communication interface; and
a processor configured to:
transmit, via the communication interface, a fine timing measurement (FTM) request frame to another wireless communication device, wherein the FTM request frame specifies a plurality of preferred physical layer (PHY) communication parameters within a field of the FTM request frame for at least one FTM frame exchange, wherein the plurality of preferred PHY communication parameters includes a modulation coding set (MCS), a frame format, a channel bandwidth, at least one channel among a plurality of channels, and a frequency band that contains one or more channels;
receive, via the communication interface, a response to the FTM request frame from the another wireless communication device;
process the response to determine whether the response includes information that confirms or overrides the plurality of preferred PHY communication parameters for the at least one FTM frame exchange, wherein the response specifies at least one other preferred PHY communication parameter when the response includes information that overrides the plurality of preferred PHY communication parameter;
perform the at least one FTM frame exchange, via the communication interface, with the another wireless communication device based on the plurality of preferred PHY communication parameters when the response confirms the plurality of preferred PHY communication parameter;
perform the at least one FTM frame exchange, via the communication interface, with the another wireless communication device based on the at least one other preferred PHY communication parameter when the response overrides the plurality of preferred PHY communication parameter; and
adapt operation of subsequent communications with the another wireless communication device based on result of the at least one FTM frame exchange with the another wireless communication device.

10. The wireless communication device of claim 9, wherein the processor is further configured to:
receive, via the communication interface, an FTM frame from the another wireless communication device that includes a plurality of timestamps; and
determine a propagation delay between the wireless communication device and the another wireless communication device based, at least in part, on the plurality of timestamps.

11. The wireless communication device of claim 10, wherein the processor is further configured to:
select at least one beamforming operational parameter based on the propagation delay; and
support, via the communication interface, subsequent communications with the another wireless communication device based on the at least one beamforming operational parameter.

12. The wireless communication device of claim 9, wherein the plurality of preferred PHY communication parameters or the at least one other preferred PHY communication parameter also includes at least one of:
a modulation type;
a forward error correction (FEC) coding type;
an error correction code (ECC) type;
an orthogonal frequency division multiplexing (OFDM) symbol type;
an OFDM frame type;
an orthogonal frequency division multiple access (OFDMA) symbol type;
an OFDMA frame type;
a data rate; or
a multiple-input-multiple-output (MIMO) configuration.

13. The wireless communication device of claim 9 further comprising:
a wireless station (STA), wherein the another wireless communication device includes an access point (AP).

14. A method for execution by a wireless communication device, the method comprising:
receiving, via a communication interface of the wireless communication device, a fine timing measurement (FTM) request frame from another wireless communication device, wherein the FTM request frame specifies plurality of preferred physical layer (PHY) communication parameters for at least one FTM frame exchange, wherein the plurality of preferred PHY communication parameters includes a modulation coding set (MCS), a frame format, a channel bandwidth, at least one channel among a plurality of channels, and a frequency band that contains one or more channels;
processing the FTM request frame to determine the plurality of preferred PHY communication parameters that is specified within a field of the FTM request frame; and
transmitting, via the communication interface of the wireless communication device, a response to the FTM request frame to the another wireless communication device, wherein the response includes information to confirm the plurality of preferred PHY communication parameters for the at least one FTM frame exchange based on a favorable comparison of the plurality of preferred PHY communication parameters that is specified within the field of the FTM request frame with a capability of the wireless communication device, and wherein the response includes information that specifies at least one other preferred PHY communication parameter for the at least one FTM frame exchange based on an unfavorable comparison of the plurality of preferred PHY communication parameters with the capability of the wireless communication device;
performing the at least one FTM frame exchange with the another wireless communication device using the plurality of preferred PHY communication parameters based on the favorable comparison of the plurality of preferred PHY communication parameters that is specified within the field of the FTM request frame with the capability of the wireless communication device or using at least one other preferred PHY communication parameter, based on the unfavorable comparison of the plurality of preferred PHY communication parameters that is specified within the field of the FTM request frame with the capability of the wireless communication device; and
adapting operation of subsequent communications with the another wireless communication device based on result of the at least one FTM frame exchange with the another wireless communication device.

15. The method of claim 14 further comprising:
transmitting, via the communication interface, an FTM frame to the another wireless communication device that includes a plurality of timestamps for use by the another wireless communication device to determine a propagation delay between the wireless communication device and the another wireless communication device.

16. The method of claim 14 further comprising:
receiving, via the communication interface, an FTM frame from the another wireless communication device that includes a plurality of timestamps; and
determining a propagation delay between the wireless communication device and the another wireless communication device based, at least in part, on the plurality of timestamps.

17. The method of claim 14 further comprising:
receiving, via the communication interface and from the another wireless communication device, a propagation delay between the wireless communication device and the another wireless communication device;
selecting at least one beamforming operational parameter based on the propagation delay; and
supporting, via the communication interface, subsequent communications with the another wireless communication device based on the at least one beamforming operational parameter.

18. The method of claim 14 further comprising:
supporting, via the communication interface, subsequent communications with the another wireless communication device after completion of the at least one FTM frame exchange based on at least one additional PHY communication parameter that is supported by both the wireless communication device and the another wireless communication device.

19. The method of claim 14, wherein the plurality of preferred PHY communication parameters or the at least one other preferred PHY communication parameter also includes at least one of:
a modulation type;
a forward error correction (FEC) coding type;
an error correction code (ECC) type;
an orthogonal frequency division multiplexing (OFDM) symbol type;
an OFDM frame type;
an orthogonal frequency division multiple access (OFDMA) symbol type;
an OFDMA frame type;
a data rate; or
a multiple-input-multiple-output (MIMO) configuration.

20. The method of claim 14, wherein the wireless communication device includes an access point (AP), and the another wireless communication device includes a wireless station (STA).

* * * * *